(12) United States Patent
Okazaki et al.

(10) Patent No.: US 8,666,635 B2
(45) Date of Patent: Mar. 4, 2014

(54) CONTROL DEVICE FOR INTERNAL COMBUSTION ENGINE

(75) Inventors: Shuntaro Okazaki, Sunto-gun (JP); Satoshi Yoshizaki, Gotemba (JP); Masashi Shibayama, Sunto-gun (JP); Kaoru Shokatsu, Susono (JP); Hajime Kawakami, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/513,978

(22) PCT Filed: Dec. 27, 2010

(86) PCT No.: PCT/JP2010/073542
§ 371 (c)(1),
(2), (4) Date: Jun. 5, 2012

(87) PCT Pub. No.: WO2012/090267
PCT Pub. Date: Jul. 5, 2012

(65) Prior Publication Data
US 2013/0275028 A1    Oct. 17, 2013

(51) Int. Cl.
*F02D 43/04* (2006.01)

(52) U.S. Cl.
USPC ............. 701/103; 123/406.23; 701/104

(58) Field of Classification Search
CPC .................................................. F02P 5/00
USPC ............ 123/344, 399, 403, 406.23, 406.24, 123/406.35, 406.45, 406.47, 436, 492, 672, 123/681, 682, 687, 704; 701/103–105, 110
See application file for complete search history.

(56) References Cited

U.S. PATENT DOCUMENTS 5,426,938 A * 6/1995 Ogawa et al. ............ 60/285
5,660,157 A * 8/1997 Minowa et al. ............. 123/344

(Continued)

FOREIGN PATENT DOCUMENTS

JP    A-08-319862    12/1996
JP    A-2003-239786    8/2003

(Continued)

OTHER PUBLICATIONS

International Search Report issued in International Application No. PCT/JP2010/073542 dated Feb. 1, 2011 (with translation).

*Primary Examiner* — Stephen K Cronin
*Assistant Examiner* — John Zaleskas
(74) *Attorney, Agent, or Firm* — Oliff PLC

(57) ABSTRACT

A control device for an internal combustion engine provided by the present invention is a control device which can satisfy a requirement concerning exhaust gas performance of the internal combustion engine, a requirement concerning fuel economy performance, and a requirement concerning operation performance with an excellent balance by properly regulating a change speed of a required air-fuel ratio and an ignition timing. The present control device keeps the ignition timing at an optimal ignition timing if a predetermined permission condition is not satisfied. However, when the permission condition is satisfied, the present control device controls the ignition timing so as to compensate for a difference which occurs between torque which is estimated from an operation of an actuator for air quantity control and required torque by the ignition timing. Further, if a predetermined lessening condition is not satisfied, the present control device determines an original required air-fuel ratio directly as a final required air-fuel ratio. However, if the lessening condition is satisfied, the present control device processes a signal of the original required air-fuel ratio to lessen a change speed thereof, and determines a required air-fuel ratio the change speed of which is lessened as a final required air-fuel ratio. The permission condition includes the required air-fuel ratio changing in a rich direction, and a change amount thereof being larger than a predetermined determination reference value, and the lessening condition includes the change amount of the required air-fuel ratio being larger than a determination reference value, and the permission condition being unsatisfied.

4 Claims, 3 Drawing Sheets

(56) References Cited

U.S. PATENT DOCUMENTS

| | | | |
|---|---|---|---|
| 5,752,485 A * | 5/1998 | Minowa et al. | 123/399 |
| 5,988,141 A * | 11/1999 | Uchida | 123/436 |
| 2001/0013335 A1* | 8/2001 | Hosokawa et al. | 123/478 |
| 2002/0002970 A1* | 1/2002 | Hosoya et al. | 123/681 |
| 2003/0015169 A1* | 1/2003 | Heslop et al. | 123/295 |
| 2005/0109318 A1* | 5/2005 | Ichihara et al. | 123/406.45 |
| 2007/0221183 A1* | 9/2007 | Kiyomura et al. | 123/696 |
| 2008/0066727 A1* | 3/2008 | Kato et al. | 123/703 |
| 2009/0125212 A1* | 5/2009 | Kurashima et al. | 701/103 |
| 2009/0292448 A1* | 11/2009 | Nakagawa et al. | 701/103 |
| 2010/0198485 A1 | 8/2010 | Ohtsuka et al. | |

FOREIGN PATENT DOCUMENTS

| | | |
|---|---|---|
| JP | A-2003-328809 | 11/2003 |
| JP | A-2005-113877 | 4/2005 |
| JP | A-2006-144672 | 6/2006 |
| JP | A-2009-047101 | 3/2009 |
| JP | A-2010-007489 | 1/2010 |

* cited by examiner

CONTROL DEVICE FOR INTERNAL COMBUSTION ENGINE

TECHNICAL FIELD

The present invention relates to a control device for an internal combustion engine, and particularly relates to a control device for an internal combustion engine which adopts torque and an air-fuel ratio as control variables.

BACKGROUND ART

As one of control methods of internal combustion engines, there is known a method which determines a manipulated variable of each actuator with torque and an air-fuel ratio as control variables. For example, Japanese Patent Laid-Open No. 2010-7489 discloses a method which determines a required torque and a required air-fuel ratio for an internal combustion engine, and determines respective manipulated variables of a throttle, an ignition device and a fuel injection device so as to realize them. With regard to a throttle, a throttle opening which is a manipulated variable thereof is determined in accordance with a target air quantity for realizing required torque. For example, with use of an inverse model of an air model, the throttle opening which is necessary for realizing the target air quantity can be obtained by calculation.

Incidentally, in addition to the quantity of the air which is taken into a cylinder, an air-fuel ratio is closely related to the torque which is generated by an internal combustion engine. When air quantity is the same, torque decreases if the air-fuel ratio of the mixture gas which is provided for combustion is leaner than stoichiometry, and torque increases if the air-fuel ratio is rich. Accordingly, in the process of converting the required torque into the target air quantity, the air-fuel ratio of the mixture gas in the cylinder, that is, the required air-fuel ratio is desirably referred to. By setting the target air quantity in accordance with the required air-fuel ratio, precision of realization of the required torque can be enhanced.

However, the required air-fuel ratio is not always constant, and is sometimes positively changed from the viewpoint of exhaust gas performance. For example, at the time of return from fuel cut, the required air-fuel ratio is made significantly richer than stoichiometry for a predetermined time period in order to recover the NOx reduction ability of a catalyst quickly. Further, in order to enhance the purifying performance of the catalyst, the required air-fuel ratio is periodically changed with stoichiometry as the center, and the required air-fuel ratio is changed by air-fuel ratio feedback control. In these cases, the target air quantity also changes in correspondence with change of the required air-fuel ratio, and the throttle opening is also controlled in correspondence with it. The movement of the throttle at this time becomes such movement as to cancel out the variation of torque accompanying the change of the air-fuel ratio by increase/decrease of the air quantity. More specifically, when the air-fuel ratio changes to a rich side, the throttle moves to a closing side to cancel out the increase in torque due to the change by decrease in the air quantity. Conversely, when the air-fuel ratio changes to a lean side, the throttle moves to an opening side to cancel out the decrease in torque due to the change by increase in the air quantity.

However, there is a delay in the response of the air quantity to the movement of the throttle, and the actual air quantity changes late with respect to the change of the target air quantity. Accordingly, when a sudden change occurs to the required air-fuel ratio, change of the air quantity does not catch up with the change of the required air-fuel ratio. As a result, the following problem occurs.

FIG. 3 is a diagram showing each change with time of torque, an engine speed, an air-fuel ratio, a fuel injection quantity, a cylinder intake air quantity and a throttle opening when the required air-fuel ratio abruptly changes, in chart. In the chart of each stage, the dotted line represents a change with time of a required value or a target value of each item, and the solid line represents an actual behavior of each item. As shown in the diagram, when the required air-fuel ratio abruptly changes to a lean side stepwise, the target air quantity also abruptly increases stepwise in response thereto. However, since the throttle opening cannot be increased stepwise, and response of the air quantity is delayed with respect to the movement of the throttle, the actual air quantity increases later than the target air quantity.

Since the fuel injection quantity is determined by the actual air quantity and the required air-fuel ratio, the fuel injection quantity temporarily decreases significantly due to a delay in increase of the air quantity. As a result, the torque generated by the internal combustion engine temporarily reduces significantly with respect to the required torque, and the engine speed also temporarily reduces significantly. With this, a variation also occurs to the actual air-fuel ratio. According to the art described in Japanese Patent Laid-Open No. 2010-7489, when the actual torque may become larger than the required torque, retardation of the ignition timing is performed so as to compensate for the deviation. However, since retardation of the ignition timing causes worsening of fuel economy, the ignition timing is desired to be kept at the optimal ignition timing as far as possible, from the viewpoint of fuel economy performance. However, when such a desire is to be satisfied, temporary reduction in the torque and the engine speed occurs when the required torque abruptly changes to a lean side as shown in FIG. 3.

In conclusion, the aforementioned conventional control method has a room for further improvement in satisfying the requirement concerning the exhaust gas performance of the internal combustion engine, the requirement concerning the fuel economy performance, and the requirement concerning the operation performance with an excellent balance.

CITATION LIST

Patent Literature

Patent Literature 1: Japanese Patent Laid-Open No. 2010-7489

Patent Literature 2: Japanese Patent Laid-Open No. 08-319862

Patent Literature 3: Japanese Patent Laid-Open No. 2006-144672

Patent Literature 4: Japanese Patent Laid-Open No. 2003-239786

SUMMARY OF INVENTION

As the solution to the aforementioned problem, it is conceivable to lessen the change speed of the required air-fuel ratio. As the means which lessens the change speed of the required air-fuel ratio, a low-pass filter such as a first-order lag filter, and moderating processing such as weighted average can be cited. By lessening the change speed of the required air-fuel ratio, delay in change of the air quantity with respect to change of the required air-fuel ratio can be eliminated. Alternatively, even though delay in the change of the air quantity with respect to change of the required air-fuel ratio cannot be completely eliminated, the delay can be sufficiently reduced to the extent that torque variation does not occur.

However, it is not always preferable from the viewpoint of exhaust gas performance to lessen the change speed of the required air-fuel ratio since the required air-fuel ratio is determined to satisfy the requirement concerning the exhaust gas performance. Meanwhile, regulating the torque generated by the internal combustion engine is also possible by control of the ignition timing. However, regulation of torque by ignition timing is effective only when the torque is reduced by retardation, and in such a case, worsening of fuel economy occurs. More specifically, the requirements concerning various kinds of performances of the internal combustion engine cannot be satisfied with an excellent balance by only lessening the change speed of the required air-fuel ratio, or by simply adjusting the ignition timing.

Thus, the present invention has an object to satisfy a requirement concerning exhaust gas performance of an internal combustion engine, a requirement concerning fuel economy performance and a requirement concerning operation performance with an excellent balance by properly regulating a change speed of a required air-fuel ratio and ignition timing in the internal combustion engine adopting torque and an air-fuel ratio as control variables. In order to attain such an object, the present invention provides a control device for an internal combustion engine as follows.

A control device provided by the present invention determines a required value of torque generated by an internal combustion engine, that is, required torque, and determines a required value of an air-fuel ratio of a mixture gas provided for combustion, that is, a required air-fuel ratio. On determination of the required air-fuel ratio, the present control device first receives a requirement concerning exhaust gas performance of the internal combustion engine, and calculates an air-fuel ratio which satisfies the requirement as a required air-fuel ratio. When a predetermined lessening condition which will be described later is not satisfied, the calculated required air-fuel ratio is directly determined as a final required air-fuel ratio. However, when the lessening condition which will be described later is satisfied, the signal of the calculated required air-fuel ratio is processed to lessen a change speed thereof, and the required air-fuel ratio the change speed of which is lessened is determined as a final required air-fuel ratio. As concrete means that lessens the change speed, a low-pass filter such as a first order lag filter, moderating processing such as weighted average also can be used.

The present control device calculates a target air quantity for realizing required torque under the required air-fuel ratio which is determined as above. For calculation of the target air quantity, data which is set by linking a relationship of torque at an optimal ignition timing and the air quantity taken into the cylinder to an air-fuel ratio can be used. The present control device manipulates an actuator for air quantity control in accordance with the target air quantity, and manipulates an actuator for fuel injection quantity control in accordance with the required air-fuel ratio.

Further, the present control device estimates an air quantity which is realized by operation of the actuator for air quantity control according to the target air quantity, and estimates torque which is realized by the estimated air quantity under the required air-fuel ratio. For calculation of the estimated torque, data which is set by linking the relationship of the air quantity at the optimal ignition timing and torque to an air-fuel ratio can be used. Subsequently, when the predetermined permission condition which will be described later is not satisfied, the present control device keeps the ignition timing at the optimal ignition timing. However, if the predetermined permission condition which will be described later is satisfied, the ignition timing is controlled to compensate for the difference which occurs between the estimated torque and the required torque by an ignition timing. More specifically, when the estimated torque is larger than the required torque, the ignition timing is retarded from the optimal ignition timing, whereby the actual torque generated by the internal combustion engine is caused to correspond to the required torque.

Here, the aforesaid permission condition includes the required air-fuel ratio calculated based on the requirement concerning the exhaust gas performance changing in a rich direction, and a change amount of the required air-fuel ratio, in more detail, a change amount at each calculation period being larger than a predetermined determination reference value. The determination reference value is preferably set at a value corresponding to a response speed of an air quantity to an operation of the actuator for air quantity control. The aforesaid lessening condition includes the change amount of the calculated required air-fuel ratio (original required air-fuel ratio) being larger than a determination reference value, and the aforesaid permission condition being unsatisfied. More specifically, when the change amount of the original required air-fuel ratio is larger than the determination reference value, if the direction of change is a rich direction, the ignition timing is controlled so as to compensate for the difference which occurs between the estimated torque and the required torque by the ignition timing while the original required air-fuel ratio is directly used as the final required air-fuel ratio. Meanwhile, when the direction of the change of the required air-fuel ratio is a lean direction, the required air-fuel ratio the change speed of which is lessened is used as the final required air-fuel ratio while the ignition timing is kept at the optimal ignition timing. When the change amount of the calculated required air-fuel ratio is the determination reference value or less, the original required air-fuel ratio is directly used as the final required air-fuel ratio, and the ignition timing is kept at the optimal ignition timing.

According to the present control device, when the calculated value of the required air-fuel ratio is abruptly changed to a rich direction, the ignition timing is retarded so as to suppress increase of torque which accompanies a delay in decrease of the air quantity with respect to the required air-fuel ratio becoming rich, and therefore, operation performance can be kept by suppressing a deviation of the torque generated by the internal combustion engine from the required torque. In this case, the original required air-fuel ratio is directly used for fuel injection quantity control, and therefore, the effect in the exhaust gas performance which can be obtained by positively changing the required air-fuel ratio can be obtained as expected.

Further, according to the present control device, when the calculated value of the required air-fuel ratio abruptly changes in a lean direction, the required air-fuel ratio the change speed of which is lessened is used for calculation of the target air quantity, and therefore, a response delay of the actual air quantity to the target air quantity can be eliminated or sufficiently reduced. As a result, a delay in change of the air quantity with respect to change of the required air-fuel ratio can be eliminated or sufficiently reduced, the operation performance can be kept by suppressing the torque variation accompanying change of the required air-fuel ratio. Further, in this case, the ignition timing is kept at the optimal ignition timing, and therefore, high fuel economy performance can be kept as it is.

As described above, according to the present control device, the requirement concerning the exhaust gas performance of an internal combustion engine, the requirement concerning fuel economy performance, and the requirement concerning the operation performance can be satisfied with an excellent balance.

The aforesaid permission condition may further include an oxygen storage amount of a catalyst disposed in an exhaust passage of the internal combustion engine exceeding a predetermined reference value. More specifically, when the change amount of the original required air-fuel ratio is larger than the air-fuel ratio change determination value, if the direction of the change is a rich direction and the oxygen storage amount of the catalyst exceeds the predetermined reference value, retardation of the ignition timing may be permitted. In other words, if the oxygen storage amount of the catalyst does not exceed the predetermined reference value, the change speed of the required air-fuel ratio which is changing in a rich direction is lessened, and the required air-fuel ratio the change speed of which is lessened can be used as a final required air-fuel ratio. The oxygen storage amount of the catalyst can be obtained by calculation based on change of the output signal of an oxygen sensor or an air-fuel ratio sensor which is disposed downstream of the catalyst.

When the oxygen storage amount of the catalyst has no margin, if the exhaust gas the air-fuel ratio of which is shifted to a lean side flows into the catalyst, the purifying performance of the catalyst sharply reduces due to saturation of the oxygen storage amount of the catalyst. However, if the oxygen storage amount of the catalyst has a certain margin, the purifying performance of the catalyst does not reduce suddenly even if the air-fuel ratio of the exhaust gas which flows into the catalyst becomes leaner than the original required air-fuel ratio. Accordingly, by the permission condition additionally including the oxygen storage amount of the catalyst exceeding the reference value, it becomes possible to satisfy the requirement concerning the fuel economy performance more while satisfying the requirement concerning the exhaust gas performance and the requirement concerning the operation performance.

Further, the present control device calculates the air-fuel ratio which is richer than stoichiometry as the required air-fuel ratio after return from fuel cut, and changes the required air-fuel ratio to stoichiometry after a lapse of a predetermined time. Thus, the oxygen storage amount of the catalyst which is in a saturated state during fuel cut can be decreased to a proper amount, and thereby, the purifying performance of the catalyst can be recovered.

In this case, it is preferable that, after return from fuel cut, the target air quantity is increased and the ignition timing is controlled so as to compensate for the difference which occurs between the estimated torque and the required torque at least until the required air fuel ratio is changed to stoichiometry after the required air-fuel ratio is made rich. When the target air quantity is increased, the actuator for air quantity control is operated in the direction of increasing the air quantity, and therefore, the aforementioned estimated torque changes in an increasing direction. As a result, the difference occurs between the estimated torque and the required torque, and the ignition timing is retarded from the optimal ignition timing by the amount of the difference. More specifically, according to the present control device, by increasing the target air quantity, the ignition timing can be retarded without occurrence of change to the torque.

Retarding the ignition timing from the optimal ignition timing is, in other words, enabling the ignition timing to advance to the optimal ignition timing. When the required air-fuel ratio is changed from rich to stoichiometry, reduction in torque occurs due to a delay in increase of the air quantity with respect to the required air-fuel ratio becoming lean. However, as described above, the ignition timing has a margin which enables the ignition timing to advance, and therefore, if the ignition timing is advanced, variation of the torque can be prevented by increasing the torque quickly. According to the present control device, the difference between the estimated torque and the required torque reduces as the required air-fuel ratio becomes leaner, whereby the ignition timing is automatically advanced to the optimal ignition timing. Thereby, the operation performance can be kept by suppressing a deviation of the torque generated by the internal combustion engine from the required torque.

DESCRIPTION OF EMBODIMENTS

An embodiment of the present invention will be described with reference to the drawings.

An internal combustion engine (hereinafter, an engine) which is an object to be controlled in the embodiment of the present invention is a spark ignition type four-cycle reciprocal engine. In an exhaust passage of the engine, a three-way catalyst for purifying exhaust gas is provided. A control device controls an operation of the engine by manipulating actuators included in the engine. The actuators which can be manipulated by the control device include an ignition device, a throttle, a fuel injection device, a variable valve timing mechanism, an EGR device and the like. However, in the present embodiment, the control device manipulates a throttle, an ignition device and a fuel injection device, and the control device manipulates these three actuators to control the operation of the engine.

The control device of the present embodiment uses torque, an air-fuel ratio and an efficiency as control variables of the engine. To be exact, the torque mentioned here means illustrated torque which the engine generates, and the air-fuel ratio means the air-fuel ratio of a mixture gas which is provided for combustion. The efficiency in the present specification means the ratio of the torque which is actually outputted with respect to potential torque which the engine can output. The maximum value of the efficiency is 1, and at this time, the potential torque which the engine can output is directly outputted actually. When the efficiency is smaller than 1, the torque which is actually outputted is smaller than the potential torque which the engine can output, and the margin thereof mainly becomes heat and is outputted from the engine.

Figure 1:
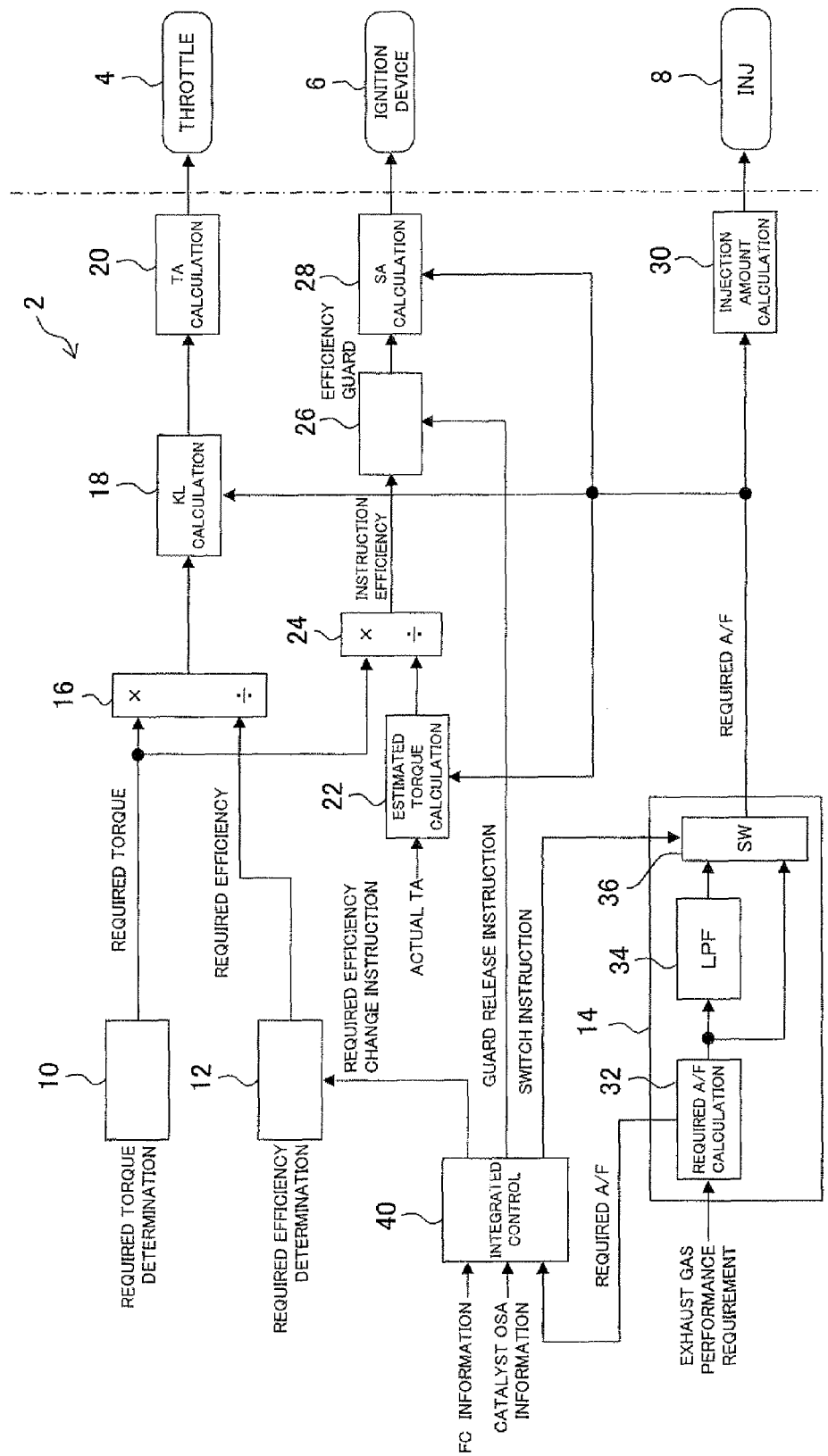
FIG. 1 is a block diagram showing a configuration of a control device of an embodiment of the present invention.

A control device 2 shown in a block diagram of FIG. 1 shows a configuration of the control device of the present embodiment. As each element configuring the control device 2 in FIG. 1, only elements relating to torque control and air-fuel ratio control by manipulation of three kinds of actuators, that is, a throttle 4, an ignition device 6 and a fuel injection device (INJ) 8 are especially expressed in the drawing, among various functional elements which the control device 2 has. Accordingly, FIG. 1 does not mean that the control device 2 is configured by only these elements. Each of the elements may be configured by exclusive hardware, or may be virtually configured by software with the hardware shared by each of the elements.

Hereinafter, the entire configuration of the control device 2 will be described with particular emphasis on the functions of each of the elements shown in FIG. 1.

First, the control device 2 determines required torque, a required efficiency and a required air-fuel ratio (required A/F) as requirements to the control variables of the engine.

Determination of the required torque is performed in a required torque determining section 10. The required torque determining section 10 determines the required torque in accordance with the operation conditions of the engine, more specifically, based on the manipulated variable of an accelerator pedal by a driver, and signals from the control systems of the vehicle such as VSC and TRC.

Determination of the required efficiency is performed in a required efficiency determining section 12. As will be described later, by setting the required efficiency at 1, the ignition timing is controlled to be the optimal ignition timing, and by setting the required efficiency at a value smaller than 1, the ignition timing is retarded from the optimal ignition timing. In the present embodiment, the required efficiency determining section 12 normally fixes the required efficiency at 1 which is the maximum value, and changes the required efficiency to a predetermined value which is smaller than 1 when an instruction (required efficiency change instruction) is given from an integrated control section 40 which will be described later.

Determination of the required air-fuel ratio is performed in a required air-fuel ratio determining section 14. The required air-fuel ratio determining section 14 includes a required air-fuel ratio calculating section 32, a low-pass filter (LPF) 34, and a switch 36. The required air fuel ratio calculating section 32 has the function of receiving a requirement concerning the exhaust gas performance of the engine, and calculating the air-fuel ratio which satisfies the requirement as the required air-fuel ratio. In more detail, an ordinary required air-fuel ratio is set at stoichiometry, but when necessary from the viewpoint of the exhaust gas performance, the required air-fuel ratio is changed to a lean side or a rich side. For example, in order to enhance the purifying performance of the catalyst, the required air-fuel ratio is changed periodically with stoichiometry as a center, and the required air-fuel ratio is changed by air-fuel ratio feedback control. Further, at the time of return from fuel cut, the required air-fuel ratio is made richer than stoichiometry for a predetermined time period in order to recover the NOx reduction ability of the catalyst quickly.

The required air-fuel ratio outputted from the required air-fuel ratio calculating section 32 is divided into two, and one of the required air-fuel ratios is passed through the low-pass filter 34 and thereafter, is inputted into the switch 36. The other required air-fuel ratio is directly inputted into the switch 36. The low pass filter 34 is, for example, a first-order lag filter, and is provided to lessen the change speed of the required air-fuel ratio. The time constant is set so that the change speed of the required air-fuel ratio which is lessened by the low-pass filter 34 becomes a response speed of the air quantity to the operation of the throttle 4 or less. The switch 36 selects any one of the inputted required air-fuel ratios, that is, any one of the required air-fuel ratio the change speed of which is lessened, and the original required air-fuel ratio in accordance with an instruction (switch instruction) from the integrated control section 40 which will be described later. The required air-fuel ratio selected by the switch 36 is determined as the final required air-fuel ratio, and is outputted from the required air-fuel ratio determining section 14.

The required air-fuel ratio which is determined in the required air-fuel ratio determining section 14 is inputted into a fuel injection quantity calculating section 30. When calculation timing of the fuel injection quantity comes in a certain cylinder, the fuel injection quantity calculating section 30 calculates a fuel injection quantity from the required air-fuel ratio and an estimated air quantity at the intake valve closing timing of the cylinder.

The control device 2 manipulates the fuel injection device 8 so as to realize the fuel injection quantity calculated in the fuel injection quantity calculating section 30.

Meanwhile, the required torque determined in the required torque determining section 10 and the required efficiency determined in the required efficiency determining section 12 are inputted into an air quantity control torque calculating section 16. The air quantity control torque calculating section 16 calculates air quantity control torque by dividing the required torque by the required efficiency. When the required efficiency is smaller than 1, the air quantity control torque is increased more than the required torque.

The air quantity control torque is inputted into a target air quantity calculating section 18. The target air quantity calculating section 18 converts air quantity control torque into a target air quantity (KL) by using an air quantity map. The air quantity mentioned here means an air quantity which is taken into the cylinder (charging efficiency which is the result of rendering the air quantity dimensionless or a load factor can be used instead). The air quantity map is a map in which torque and an air quantity are linked to each other with various engine state quantities including an engine speed and an air-fuel ratio as a key on the precondition that the ignition timing is an optimal ignition timing (ignition timing at a more retardant side, of MBT and trace knock ignition timing). The air quantity map is created based on the data which is obtained by testing the engine. For search of the air quantity map, the actual values and the target values of the engine state quantities are used. With regard to the air-fuel ratio, the required air-fuel ratio which is determined in the required air-fuel ratio determining section 14 is used for map search. Accordingly, in the target air quantity calculating section 18, the air quantity necessary for realization of the air quantity control torque under the required air-fuel ratio is calculated as the target air quantity of the engine. When the required efficiency is smaller than 1, the target air quantity is increased. This means that the throttle 4 is required to be potentially capable of outputting torque larger than the required torque.

The target air quantity is inputted into a target throttle opening calculating section 20. The target throttle opening calculating section 20 converts the target air quantity (KL) into a throttle opening (TA) by using an inverse model of an air model. The air model is a physical model which is made by modeling the response property of the air quantity to the operation of the throttle 4, and therefore, by using the inverse model of the air model, the throttle opening which is necessary for achievement of the target air quantity can be inversely calculated.

The control device 2 performs manipulation of the throttle 4 in accordance with the throttle opening which is calculated in the target throttle opening calculating section 20.

The control device 2 carries out calculation of estimated torque based on the actual throttle opening (actual TA) in an estimated torque calculating section 22, in parallel with the above described processing. The estimated torque in the present description is an estimated value of the torque which can be outputted when the ignition timing is set at an optimal ignition timing under the present throttle opening, that is, the torque which can be potentially outputted by the engine. The estimated torque calculating section 22 firstly converts the throttle opening into the estimated air quantity by using a forward model of the aforementioned air model. Next, the estimated air quantity is converted into the estimated torque by using a torque map. The torque map is an inverse map of the aforementioned air quantity map, and is a map in which the air quantity and torque are linked to each other with various engine state quantities as the key on the precondition that the ignition timing is an optimal ignition timing. In search of the torque map, the required air-fuel ratio which is determined in the required air-fuel ratio determining section 14 is used. Accordingly, in the estimated torque calculating section 22, the torque which is estimated to be realized by the estimated air quantity under the required air-fuel ratio is calculated.

The estimated torque is inputted into an ignition timing control efficiency calculating section 24 together with the duplicated target torque. The ignition timing control efficiency calculating section 24 calculates the ratio of the required torque and the estimated torque. The calculated ratio means the efficiency for realizing the required torque, and is used as instruction efficiency for ignition timing control.

The instruction efficiency for ignition timing control is inputted into an ignition timing calculating section 28 after passing through an efficiency guard section 26. The efficiency guard section 26 restricts a maximum value and a minimum value of the instruction efficiency by an upper limit guard value and a lower limit guard value. The upper limit guard value is a fixed value, and is set at 1 which is the maximum value of the efficiency. Meanwhile, the lower limit guard value is variable, and can take at least two values. A normal value of the lower limit guard value is 1, and in this case, the value of the instruction efficiency which is inputted into the ignition timing calculating section 28 is kept at 1, irrespective of the ratio of the required torque and the estimated torque. The lower limit guard value is changed only when an instruction (guard release instruction) is given from an integrated control section 40 which will be described later. In this case, the efficiency guard section 26 sharply reduces the lower limit guard value to such a value as to be able to ensure combustion.

The ignition timing calculating section 28 calculates an ignition timing (SA) from the inputted instruction efficiency for ignition timing control. In more detail, the optimal ignition timing is calculated based on the engine state quantities such as the engine speed, the required torque and the air-fuel ratio, and a retardation amount with respect to the optimal ignition timing is calculated from the instruction efficiency for ignition timing control which is inputted. If the instruction efficiency is 1, the retardation amount is set as zero, and as the instruction efficiency is smaller than 1, the retardation amount is set to be larger. Subsequently, what is obtained by adding up the retardation amount to the optimal ignition timing is calculated as a final ignition timing. For calculation of the optimal ignition timing, a map in which the optimal ignition timing and the various engine state quantities are linked to one another can be used, for example. For calculation of the retardation amount, a map in which the retardation amount and efficiency, and various engine state quantities are linked to one another can be used, for example. For search of the maps, the actual values and the target values of the engine state quantities are used. In regard with the air-fuel ratio, the required air-fuel ratio which is determined in the required air-fuel ratio determining section 14 is used for map search.

The control device 2 performs manipulation of the ignition device 6 in accordance with the ignition timing calculated in the ignition timing calculating section 28. As described above, the instruction efficiency is normally kept at 1, and therefore, normally, that is, as long as the lower guard value of the instruction efficiency is not released in the efficiency guard section 26, the ignition timing is kept at the optimal ignition timing.

Next, the function of the integrated control section 40 which is a main part of the control device 2 of the present embodiment will be described in detail. As described above, the integrated control section 40 gives an instruction to the required efficiency determining section 12, the switch 36 of the required air-fuel ratio determining section 14 and the efficiency guard section 26, and integrally controls them. The content of integrated control of the respective elements 12, 26 and 36 which is performed by the integrated control section 40 can be shown by a flowchart of FIG. 2.

Figure 2:
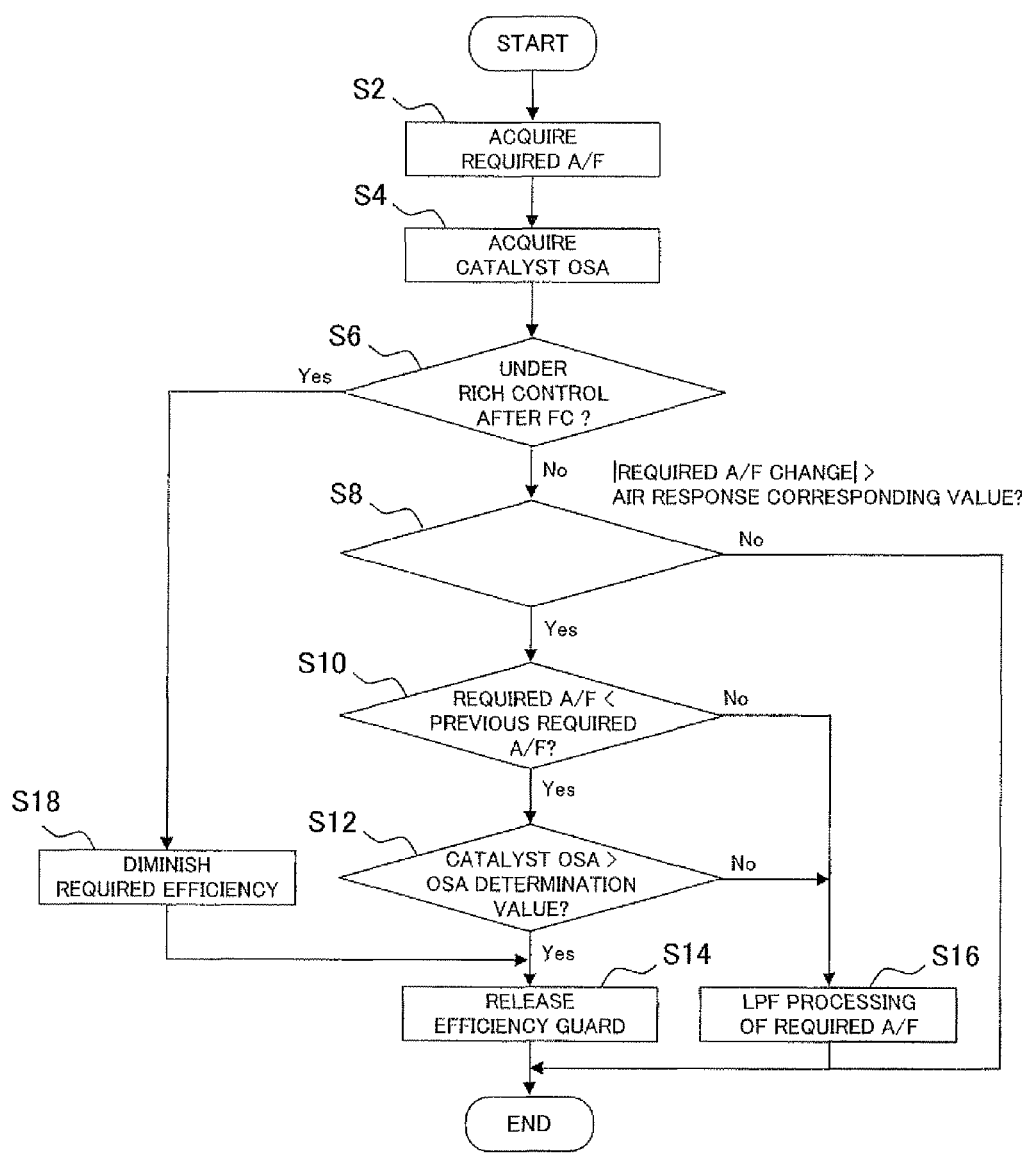
FIG. 2 is a flowchart showing processing carried out in the control device of the embodiment of the present invention.
Figure 3:
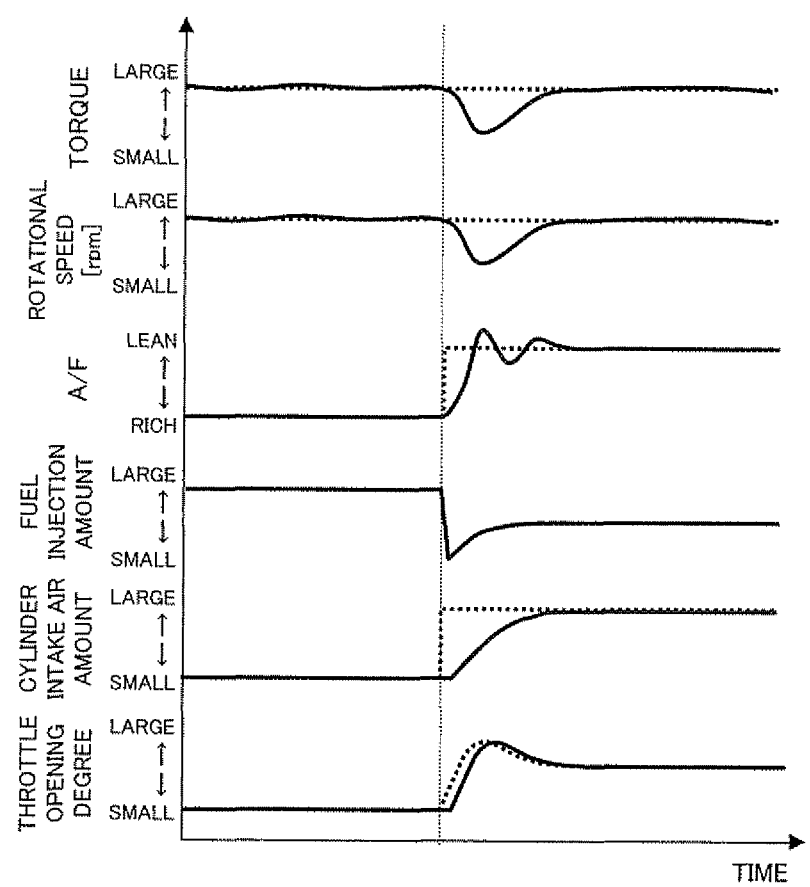
FIG. 3 is a diagram for explaining a conventional problem.

According to the flowchart of FIG. 2, in the first step S2, the integrated control section 40 acquires the calculated value of the required air-fuel ratio (required A/F) from the required air-fuel ratio calculating section 32. Further, in the next step S4, the integrated control section 40 acquires information concerning an oxygen storage amount (OSA) of a catalyst disposed in an exhaust passage. The oxygen storage amount of the catalyst can be obtained by calculation based on change of the output signal of an oxygen sensor disposed downstream of the catalyst. In the present embodiment, the information concerning the oxygen storage amount is taken in the integrated control section 40 from an outside, but the oxygen storage amount may be calculated inside the integrated control section 40 by taking the output signal of the oxygen sensor into the integrated control section 40.

In the next step S6, the integrated control section 40 determines whether rich control after return from fuel cut (rich control after FC) is performed at present based on externally inputted information. For a period of time after return from fuel cut, in order to decrease the oxygen storage amount of the catalyst which is in a saturated state during the fuel cut to a proper amount, the required air-fuel ratio is changed to a rich side, and the air-fuel ratio of the exhaust gas which flows into the catalyst is made richer than stoichiometry. If such control is not carried out, the integrated control section 40 carries out determination of step S8 next.

In step S8, the integrated control section 40 determines whether the change amount per one calculation period of the required air-fuel ratio is larger than an air response corresponding value which is a determination reference value. The air response corresponding value is a value which corresponds to a response speed of an air quantity to the operation of the throttle 4. The integrated control section 40 has a map in which the air response corresponding value is linked to an engine speed and a load, and determines the air response corresponding value for use in determination by referring to the map. If the determination result of step S8 is negative, the integrated control section 40 does not change the instruction to the respective elements 12, 26 and 36, but keeps the present control state. Meanwhile, if the determination result is affirmative, the integrated control section 40 carries out determination of step 10 next.

In step S10, the integrated control section 40 determines whether the present value of the required air-fuel ratio is smaller than the previous value of the required air-fuel ratio, that is, whether the required air-fuel ratio has changed in a rich direction. If the determination result is negative, that is, if the direction of change of the required air-fuel ratio is a lean direction, the integrated control section 40 performs the processing of step S16. Meanwhile, if the determination result is affirmative, that is, if the direction of change of the required air-fuel ratio is a rich direction, the integrated control section 40 performs determination of step 12 next.

In step S12, the integrated control section 40 determines whether the oxygen storage amount of the catalyst is larger than the OSA determination value which is the determination reference value, that is, whether the oxygen storage amount of the catalyst has a margin. If the determination result is negative, that is, if the oxygen storage amount of the catalyst has a margin, the integrated control section 40 performs processing of step S16. Meanwhile, if the determination result is affirmative, that is, if the oxygen storage amount of the catalyst does not have a margin, the integrated control section 40 carries out processing of step S14.

In step S14, the integrated control section 40 gives a guard release instruction to the efficiency guard section 26, and causes the efficiency guard section 26 to release the lower limit value. As a result, the instruction efficiency for ignition timing control which is inputted into the ignition timing calculation section 28 can take a value smaller than 1. As the instruction efficiency becomes smaller than 1, the ignition timing is retarded from the optimal ignition timing.

In step S16, the integrated control section 40 outputs a switch instruction to the switch 36 of the required air-fuel ratio determining section 14. Thereby, the required air-fuel ratio which is outputted from the required air-fuel ratio determining section 14 is switched from the original required air-fuel ratio which is calculated in the required air-fuel ratio calculating section 32 to the required air-fuel ratio the change speed of which is lessened by the low-pass filter 34.

As a result of the determination of step S6, if rich control is carried out after FC, the integrated control section 40 carries out the processing of step S18, and subsequently carries out the processing of step S14. In step S18, the integrated control section 40 gives an instruction to the required efficiency determining section 12, and causes the required efficiency determining section 12 to change the required efficiency to a value smaller than 1. Thereby, the air quantity control torque calculated in the air quantity control torque calculating section 16 becomes a larger value than the required torque, and the target air quantity which is calculated in the target air quantity calculating section 18 is increased. Change of the required efficiency to the value lower than 1 is kept until a predetermined time elapses after the required air-fuel ratio is returned to stoichiometry again.

Such integrated control is carried out by the integrated control section 40, whereby the object of the present invention to satisfy the requirement concerning the exhaust gas performance of the engine, the requirement concerning the fuel economy performance, and the requirement concerning the operation performance with an excellent balance is achieved as described as follows.

First, the case in which the calculated value of the required air-fuel ratio by the required air-fuel ratio calculating section 32 abruptly changes to a lean direction will be described. In this case, according to the aforementioned integrated control, the required air-fuel ratio the change speed of which is lessened by the low-pass filter 34 is outputted as a final required air-fuel ratio. Subsequently, the target air quantity is calculated by using the required air-fuel ratio the change speed of which is lessened. The lessened change speed of the required air-fuel ratio is set as not more than a response speed of air to the operation of the throttle 4, and therefore, the change speed of the target air quantity can be realized by the operation of the throttle 4. Accordingly, the actual air quantity can be changed without lagging behind the change of the required air-fuel ratio, and the operation performance can be kept by suppressing torque variation which accompanies change in the required air-fuel ratio. Further, since in this case, release of the lower limit guard value by the efficiency guard section 26 is not performed, the ignition timing is kept at an optimal ignition timing, and high fuel economy performance is kept as it is.

Next, the case in which the calculated value of the required air-fuel ratio abruptly changes in a rich direction will be described. If the change speed of the required air-fuel ratio which is changing in the rich direction is lessened, the air-fuel ratio of the exhaust gas which flows into the catalyst shifts to a lean side from the original required air-fuel ratio. When the exhaust gas the air-fuel ratio of which shifts to the lean side flows into the catalyst, if the oxygen storage amount of the catalyst has no margin, the purifying performance of the catalyst is likely to reduce sharply due to saturation of the oxygen storage amount of the catalyst. In this case, according to the aforementioned integrated control, release of the lower limit guard value by the efficiency guard section 26 is performed, while the required air-fuel ratio which is outputted is kept at the original required air-fuel ratio, and retardation of the ignition timing from the optimal ignition timing is permitted. Thereby, even if increase in torque occurs due to delay in decrease of the air quantity in response to the required air-fuel ratio being rich, the ignition timing is automatically retarded so as to suppress it. Accordingly, in this case, the requirements concerning the operation performance can be satisfied by suppressing the torque variation of the engine while the effect in the exhaust gas performance is obtained as expected.

Meanwhile, even if the exhaust gas the air-fuel ratio of which shifts to a lean side flows into the catalyst, if the oxygen storage amount of the catalyst has a certain margin, the purifying performance of the catalyst does not reduce suddenly. In this case, according to the aforementioned integrated control, the required air-fuel ratio the change speed of which is lessened by the low-pass filter 34 is outputted as a final required air-fuel ratio while the ignition timing is kept at the optimal ignition timing. Subsequently, the target air quantity is calculated by using the required air-fuel ratio the change speed of which is lessened, and the throttle 4 is manipulated in accordance with the target air quantity. Thereby, the actual air quantity can be increased without lagging behind the required air-fuel ratio becoming lean, and the requirement concerning the operation performance can be satisfied by suppressing torque variation of the engine while the fuel economy performance is kept.

In the end, the case in which the required air-fuel ratio which is made rich after return from fuel cut is returned to stoichiometry again will be described. According to the aforementioned integrated control, until the required air-fuel ratio is returned to stoichiometry again after the required air-fuel ratio is made rich with return from fuel cut, the target air quantity is increased, and in parallel with this, release of the lower guard value by the efficiency guard section 26 is performed. By increase in the target air quantity, the throttle 4 is operated in the direction to increase the opening. As a result, the estimated torque which is calculated based on the actual throttle opening becomes larger than the required torque, and the ignition timing is retarded from the optimal ignition timing so as to compensate for the difference. The ignition timing is retarded, whereby a margin to enable the ignition timing to advance is generated between the optimal ignition timing and the present ignition timing correspondingly.

When the required air-fuel ratio is changed from rich to stoichiometry thereafter, reduction in torque occurs due to delay in increase of the air quantity with respect to the required air-fuel ratio becoming lean. However, as described above, a margin is in the ignition timing so that the ignition timing can be advanced, and therefore, if the ignition timing is advanced, the torque can be quickly increased to be able to prevent variation of torque. According to the control device 2 of the present embodiment, the difference between the estimated torque and the required torque is reduced as the required air-fuel ratio becomes lean, whereby the ignition timing is automatically advanced to the optimal ignition timing. Thereby, the operation performance can be kept by suppressing the deviation of the torque generated by the engine from the required torque.

As described above, according to the control device 2 of the present embodiment, the requirement concerning the exhaust gas performance of the engine, the requirement concerning the fuel economy performance and the requirement concerning the operation performance can be satisfied with an excellent balance.

The present invention is not limited to the aforementioned embodiment, and can be carried out by being variously modified in the range without departing from the gist of the present invention. For example, in the aforementioned embodiment, the throttle is used as the actuator for air quantity control, but an intake valve with a variable lift quantity or working angle can be used.

Further, in the aforementioned embodiment, the change speed of the required air-fuel ratio is lessened by the low-pass filter, but so-called modulating processing may be used. As one example of modulating processing, weighted average can be cited. Alternatively, by applying guard processing to the change rate of the required air-fuel ratio, the change speed can be lessened.

DESCRIPTION OF REFERENCE NUMERALS

2 Control device
4 Throttle
6 Ignition device
8 Fuel injection device
10 Required torque determining section
12 Required efficiency determining section
14 Required air-fuel ratio determining section
16 Air quantity control torque calculating section
18 Target air quantity calculating section
20 Target throttle opening calculating section
22 Estimated torque calculating section
24 Ignition timing control efficiency calculating section
26 Efficiency guard section
28 Ignition timing calculating section
30 Fuel injection quantity calculating section
32 Required air-fuel ratio calculating section
34 Low-pass filter
36 Switch
40 Integrated control section

The invention claimed is:

1. A control device for an internal combustion engine, comprising:
    required torque determining means that determines a required torque, which is a required value of torque generated by an internal combustion engine;
    required air-fuel ratio determining means that determines a required air-fuel ratio, which is a required value of an air fuel ratio of a mixture gas provided for combustion;
    target air quantity calculating means that calculates a target air quantity for realizing the required torque under the required air-fuel ratio, based on data set by linking a relationship of an air quantity and torque in an optimal ignition timing to an air-fuel ratio;
    air quantity control means that manipulates an actuator for air quantity control in accordance with the target air quantity;
    fuel injection quantity control means that manipulates an actuator for fuel injection quantity control in accordance with the required air-fuel ratio;
    torque estimating means that estimates an air quantity which is realized by operation of the actuator for air quantity control, and estimates torque which is realized by the estimated air quantity under the required air-fuel ratio, based on data set by linking a relationship of an air quantity and torque in an optimal ignition timing to an air-fuel ratio; and
    ignition timing control means that controls an ignition timing to compensate for a difference which occurs between the estimated torque and the required torque by an ignition timing when a predetermined permission condition is satisfied, and keeps the ignition timing at an optimal ignition timing when the permission condition is not satisfied,
    wherein the required air-fuel ratio determining means comprises
    required air-fuel ratio calculating means that receives a requirement concerning exhaust gas performance of the internal combustion engine, and calculates an air-fuel ratio which satisfies the requirement as a required air-fuel ratio,
    change speed lessening means that processes a signal of the required air-fuel ratio calculated in the required air-fuel ratio calculating means to lessen a change speed thereof, and
    final determining means that determines the required air-fuel ratio the change speed of which is lessened by the change speed lessening means as a final required air-fuel ratio when a predetermined lessening condition is satisfied, and determines the required air-fuel ratio calculated in the required air-fuel ratio calculating means as a final required air-fuel ratio when the lessening condition is not satisfied,
    the permission condition includes the required air-fuel ratio calculated in the required air-fuel ratio calculating means changing in a rich direction, and a change amount thereof being larger than a predetermined determination reference value, and
    the lessening condition includes the change amount of the required air-fuel ratio calculated in the required air-fuel ratio calculating means being larger than the determination reference value, and the permission condition being unsatisfied.

2. The control device for an internal combustion engine according to claim 1,
    wherein the permission condition further includes an oxygen storage amount of a catalyst disposed in an exhaust passage of the internal combustion engine exceeding a predetermined reference value.

3. The control device for an internal combustion engine according to claim 1,
    wherein the required air-fuel ratio calculating means is configured to calculate an air-fuel ratio which is richer than stoichiometry as a required air-fuel ratio after return from fuel cut, and change the required air-fuel ratio to stoichiometry after a lapse of a predetermined time,
    the control device further comprises target air quantity increasing means that increases the target air quantity at least until the required air-fuel ratio is changed to stoichiometry after the required air-fuel ratio is made rich, after return from fuel cut, and the ignition timing control means is configured to compensate for the difference which occurs between the estimated torque and the required torque by advance or retardation of the ignition timing at least while the target air quantity is increased.

4. A control device for an internal combustion engine, comprising:

an actuator for air quantity control;
an actuator for fuel injection quantity control; and
a controller that is programmed to:
determine a required torque, which is a required value of torque generated by an internal combustion engine;
determine a required air-fuel ratio, which is a required value of an air fuel ratio of a mixture gas provided for combustion;
calculate a target air quantity for realizing the required torque under the required air-fuel ratio, based on data set by linking a relationship of an air quantity and torque in an optimal ignition timing to an air-fuel ratio;
manipulate the actuator for air quantity control in accordance with the target air quantity;
manipulate the actuator for air quantity control in accordance with the target air quantity;
manipulate the actuator for fuel injection quantity control in accordance with the required air-fuel ratio;
estimate an air quantity which is realized by operation of the actuator for air quantity control;
estimate torque which is realized by the estimated air quantity under the required air-fuel ratio, based on data set by linking a relationship of an air quantity and torque in an optimal ignition timing to an air-fuel ratio; and
control an ignition timing to compensate for a difference which occurs between the estimated torque and the required torque by an ignition timing when a predetermined permission condition is satisfied, and keeps the ignition timing at an optimal ignition timing when the permission condition is not satisfied, wherein the controller receives a requirement concerning exhaust gas performance of the internal combustion engine; calculates an air-fuel ratio which satisfies the requirement as a required air-fuel ratio; processes a signal of the required air-fuel ratio to lessen a change speed thereof; and determines the required air-fuel ratio the change speed of which is lessened as a final required air-fuel ratio when a predetermined lessening condition is satisfied, and determines the required air-fuel ratio the change speed of which is not lessened as a final required air-fuel ratio when the lessening condition is not satisfied, and wherein the permission condition includes the required air-fuel ratio the change speed of which is not lessened changing in a rich direction, and a change amount thereof being larger than a predetermined determination reference value, and the lessening condition includes the change amount of the required air-fuel ratio the change speed of which is not lessened being larger than the determination reference value, and the permission condition being unsatisfied.

* * * * *